Patented July 27, 1954

2,684,973

UNITED STATES PATENT OFFICE 2,684,973

STANNANEDIOL DERIVATIVES

Gerry P. Mack, Jackson Heights, N. Y., and Ferdinand Bernard Savarese, Westwood, N. J., assignors to Advance Solvents & Chemical Corporation, New York, N. Y.

No Drawing. Application October 8, 1952,
Serial No. 313,806

7 Claims. (Cl. 260—429)

The invention relates to new organometallic tin compounds.

The new compounds correspond to the formula (1) 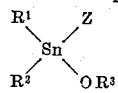

wherein $R^1$ and $R^2$ stand for the same or different monovalent hydrocarbon radical, $OR^3$ is an alkoxy radical and Z is the radical of a monocarboxylic acid or of a di- or polycarboxylic acid in which all carboxylic groups but one are esterified with an alcohol.

These compounds may be designated as ether-esters of hydrocarbon-substituted stannanediols, i. e. such stannanediol derivatives in which one hydroxyl group of the stannanediol is substituted by an alkoxy radical and the other hydroxyl group by the radical of a monocarboxylic acid or of a halfester of a dicarboxylic acid or of a polyester of a polycarboxylic acid having $n$ carboxylic acid groups of which $(n-1)$ groups have been esterified with the same or different alcohols.

The general procedure for preparing the new compounds consists in reacting an organo-tin dihalide with an alcoholate of the alcohol which has to form the alkoxy group, and with a salt of a monocarboxylic acid or of a halfester of a dicarboxylic acid or of a diester of a tricarboxylic acid. Such salt should have a cation forming halides which are insoluble or difficultly soluble in the solvent, such as alkali, earth alkali, or ammonium. As solvent, we use preferably the anhydrous alcohol of which the alcoholate is a component of the reaction mixture.

The reaction takes place according to the following equations:

(2) $R^1R^2SnX_2 + MeOR^3 + MeO_2CR^4 \rightarrow$
$\qquad R^1R^2Sn(OR^3)(O_2CR^4) + 2MeX$ (3) $R^1R^2SnX_2 + MeOR^3 + MeO_2CR^5(CO_2R^6)_n \rightarrow$
$\qquad R^1R^2Sn(OR^3)(O_2CCR^5(CO_2R^6)_n) + 2MeX$ wherein $R^1$, $R^2$ and $OR^3$ have the same significance as in Formula 1; $R^4$ is hydrogen or the hydrocarbon residue of a monocarboxylic acid, $R^5$ is the hydrocarbon residue of a di- or tricarboxylic acid, $R^6$ is the residue of an alcohol esterifying the carboxylic groups, $n$ is 1 or 2, X is halogen and Me an alkali or alkaline earth metal.

Water is undesirable during the reaction, and we use therefore anhydrous solvents and reactants. The salts of the employed acids or partial esters are preferably prepared by neutralization of the carboxylic group with a sodium alcoholate according to the reaction $RCO_2H + NaOR^1 \rightarrow RCO_2Na + R^1OH$ But other neutralizing agents can be used as for example sodium hydroxide or metallic sodium or potassium.

A convenient procedure consists in dissolving the calculated amount of sodium metal in the anhydrous alcohol employed for furnishing the alkoxy group of the end product, and adding the calculated amount of the monocarboxylic acid or of the di- or polycarboxylic acid, of which all but one carboxylic groups are already esterified, to the sodium alkoxide solution under cooling to prevent saponification of the ester group. When then an organo-tin dihalide is added to the solution, the reaction as indicated above in Equations 2 or 3 takes place. The sodium halide formed in the reaction is removed and the solvent distilled off under reduced pressure.

The stannanediol ether esters thus obtained are soluble in most organic solvents such as alcohols, ketones, esters, aromatic hydrocarbons, also in a wide variety of plasticizers used in the compounding of vinyl resins. They can be polymerized to form polystannanediol ether esters of the formula (4) 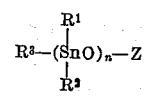

wherein $R^1$, $R^2$, $R^3$ and Z have the same significance as hereinbefore and $n$ designates the degree of polymerization. A suitable polymerization procedure is a heat treatment in the presence of moisture, as disclosed for stannanediol diesters and diethers in the copending application, Serial No. 132,406, by Gerry P. Mack and Emery Parker, filed December 10, 1949, now Patent No. 2,628,211.

The new compounds contain three different types of groups, i. e. (1) the hydrocarbon groups $R^1$ and $R^2$ directly linked to the tin atom, (2) the alkoxy group $OR^3$, and (3) the carboxylic acid radical Z. Each of these groups can be varied and a very large number of such compounds can be prepared. We shall not attempt to list all the possible starting materials and combinations but we will give, in the following description, a selective list of reactants which may be used in reactions as defined in the Formulas 2 and 3, and we shall then describe in the examples some compounds illustrative of the new group of organo-tin compounds. It should be understood that these examples are not given to limit our invention in any way.

The $R^1$ and $R^2$ groups of the above formulae are furnished by organo-tin dihalides $R^1R^2SnX_2$, in which $R^1$ and $R^2$ may be different but will be generally the same as the latter halides are more readily available in commerce and as the nature of these R groups has in most cases no or little influence on the properties of the ether esters which are controlled by the nature of the ether and ester groups, $OR^3$ and Z. $R^1$ and $R^2$ may be, for instance, methyl, ethyl, propyl, butyl, amyl, hexyl, octyl, lauryl, allyl, benzyl, phenyl, tolyl, cyclohexyl; X is Cl or Br.

As the alcohol component, we can use aliphatic, cyclic or aromatic alcohols, also ether and thio-ether alcohols, such as methanol, ethanol, propanol, allyl alcohol, butyl alcohol, octyl alcohol, oleyl alcohol, furfuryl alcohol, tetrahydrofurfuryl alcohol, benzyl alcohol, cinnamyl alcohol, phenylethyl alcohol, methoxyethyl alcohol, ethoxyethyl alcohol, butoxyethyl alcohol, methyl hydroxyethyl sulfide, ethyl hydroxyethyl sulfide and others.

The acid component can be an aliphatic aromatic or alicyclic saturated or unsaturated monocarboxylic acid such as formic, acetic, propionic, butyric, valeric, 2-ethylhexoic, caprylic, lauric, myristic, stearic, acrylic, crotonic, oleic, linoleic, ricinoleic, sorbic, furoic, benzoic, cinnamic, phenylacetic, fencholic, cyclohexylacetic, cyclohexylbutyric acid, and other acids.

As stated hereinabove, also any polycarboxylic acid can be used for the reaction, provided that only one of the carboxylic acid groups is free or in the form of the salt and that all the other carboxylic acid groups are esterified with one or more of the alcohols enumerated above for the introduction of the alkoxy group. Therefore, we can employ the halfester of dicarboxylic acids, such as malonic, succinic, glutaric, adipic, sebacic, fumaric, maleic, itaconic, citraconic, phthalic, hexahydrophthalic, 3,6-endomethylene tetrahydrophthalic, 3,6-endoxotetrahydrophthalic, camphoric acid and other acids. In the same way, tricarboxylic acids such as citric acid, tricarballylic acid and the like can be employed if two of the acid groups are in the esterified state.

Example 1

53.9 g. of lauric acid (0.25 mol) having a molecular weight of 215.6 were dissolved in 500 cc. of anhydrous methanol and neutralized with 27 g. of sodium methoxide (0.5 mol) dissolved in 250 cc. of methanol.

The resulting soap was finely dispersed in the methanol by high speed stirring and then 76 g. of dibutyl tin dichloride (0.25 mol) dissolved in 100 cc. of methanol were added to the soap-sodium methoxide solution at 25° C. and stirred until the batch was neutral. The salt formed in the reaction was filtered off and the methanol distilled off. The residual oily tin compound was purified by dissolving it in cold benzene and by filtering off the impurities, and it was recovered by removing the benzene by vacuum distillation. The obtained viscous liquid (specific gravity 1.1260; ref. index 1.4860) corresponded on the basis of its tin, methoxy and lauric acid content (found: Sn=25.0%, CH₃O=6.4%, C₁₁H₂₃COOH=45.3%), to the formula

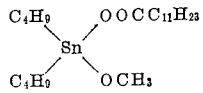

The amount of sodium chloride obtained was 29.5 g. corresponding to the theoretic amount. Dibutyltinmethoxylaurate requires theoretically 24.81% of tin, 6.5% of methoxy and 45.15% of lauric acid.

Example 2

4.6 g. of sodium metal were dissolved in 400 cc. of n. butanol, and 28.3 g. of oleic acid were added to this solution. The solution so obtained was reacted with 68.8 g. of diphenyl tin dichloride. After the completion of the reaction the salt and the excess butanol was removed; the last traces of sodium chloride were eliminated by dissolving the residue in benzene, filtering and removing the solvent. The soft waxy product obtained was diphenyltinbutoxyoleate and corresponded to the formula:

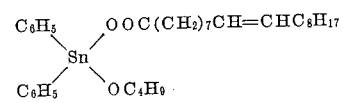

as substantiated by the tin, oleic acid and butoxy content of the compound.

Example 3

In an identical manner as described in the previous examples diethyl tin ethoxyethoxide crotonate was prepared by reacting 49.5 g. of diethyl tin dichloride with an equimolar mixture of sodium crotonate and sodium ethoxyethoxide, prepared by dissolving 9.2 g. of sodium metal in a large excess of ethylene glycol monoethyl ether, and adding 17.2 g. of crotonic acid to this solution. The salt formed in the reaction was filtered off and the excess ethyleneglycol monoethyl ether was removed by vacuum distillation. The resulting liquid product had, after purification, the formula

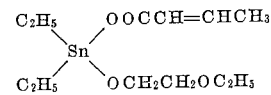

(Theory: Sn=33.82%; crotonic acid=24.52%. Found: Sn=33.71%; crotonic acid=24.70%.

Example 4

81 g. of sodium methoxide (1.5 mols) were dissolved in 750 cc. of cold methanol, and 98.6 g. of monomethyl maleate (0.75 mols) were added slowly under cooling at 0° C. The clear solution thus obtained was reacted with 227.8 g. of dibutyl tin dichloride (0.75 mol) under cooling and stirring at 0–5° C. and stirring was continued until the mixture became neutral. The salt formed in the reaction was removed by filtration; then the methanol was distilled off and the residual oil extracted with cold toluol. After distilling off the toluol, a liquid product (spec. gravity=1.3740; refr. index=1.5103) was obtained which was dibutyl tin monomethoxy methylmaleate and had the formula

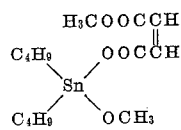

as substantiated by the analysis of the tin, methoxy and maleic acid content.

(Theory: Sn=30.21%; CH₃O=15.79%; maleic acid=29.54%. Found: Sn=30.70%; CH₃O=15.83%; maleic acid=29.80%.)

In an identical manner the following products were prepared:

Dibutyl tin monomethoxy butyl maleate of the formula

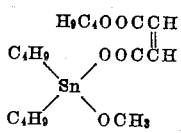

Sp. gravity=1.3250  Refr. index=1.5068
Tin required=27.29%  Found=28.09%
Methoxy required=6.97%  Found=7.05%

Dibutyl tin monomethoxy allyl maleate which corresponded to the formula

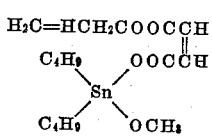

Spec. gravity=1.2910  Refr. index=1.5011
Tin required=28.34%  Found=27.99%
Methoxy required=7.41%  Found=7.27%

Dibutyl tin monomethoxy tetrahydrofurfuryl maleate which had the formula

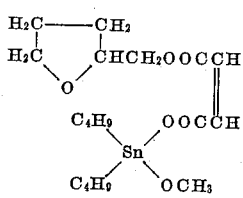

Spec. gravity=1.2730  Refr. index=1.5036
Tin required=25.64%  Found=25.3%
Methoxy required=6.7%  Found=6.58%

Dibutyl tin methoxy oleyl maleate of the formula

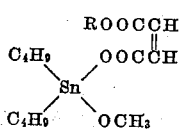

wherein R represents the radical

CH$_3$(CH$_2$)$_7$CH:CH(CH$_2$)$_8$(9-octadecenyl)

Spec. gravity at 25° C.=1.1290; refr. index at 25° C.=1.4882; tin required, 18.85; found, 19.0.

Dibutyl tin monomethoxy methyl succinate of the formula

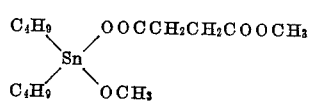

Spec. gravity=1.3500  Refr. index=1.4980
Tin required=29.67%  Found=29.80%
Methoxy required=15.48%  Found=15.40%

Dibutyl tin monomethoxy methyl phthalate which had the formula

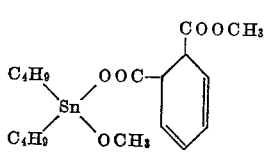

Spec. gravity=1.3700  Refr. index=1.5448
Tin required=26.8%  Found=26.7%
Methoxy required=14.01%  Found=13.95%

Diethyl tin monoethoxy ethyl sebacate which had the formula

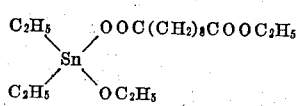

Tin required=26.3%; found=26.0%.

Diphenyl tin monomethoxy butyl itaconate having the formula

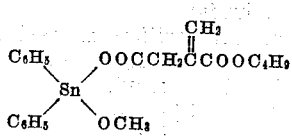

Tin required=24.26%  Found=24.50%
Methoxy required=6.35%  Found=6.22%

*Example 5*

This example is given to illustrate the preparation of hydrocarbon substituted polystannanediol alpha, omega ether esters.

27.0 g. of sodium methoxide and 41.0 of anhydrous sodium acetate in the form of a fine powder were slurried in 500 cc. of dry benzene. 303.8 g. of dibutyl tin dichloride dissolved in 250 cc. of dry benzene were dropped in under vigorous stirring and cooling at 10–20° C. Stirring was continued for several hours after the addition was completed, until a filtered sample did not contain chlorine. The sodium chloride was filtered off and the benzene distilled off under reduced pressure at 20–30° C. The remaining colorless liquid corresponded to the formula:

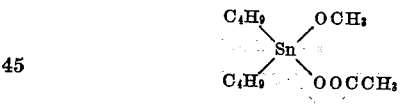

which requires:

Sn=36.75%  Found=36.70%
CH$_3$O=9.62%  Found=9.53%
CH$_3$COOH=19.2%  Found=19.05%

50 g. of this dibutyl tin methoxy acetate were placed in a flask and moist air was blown through the liquid at 95–100° C. and the gases were condensed. The condensate contained methanol and acetic acid; the liquid residue solidified on cooling to a waxy solid easily soluble in organic solvents. According to the analysis of this solid, it had the formula:

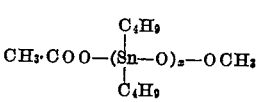

whereby $x$ was approximately 3 as its tin content was 42.2%, methoxy content 3.52%, acetic acid—7.26%; a polymer having $x$=3 requires Sn=42.4%, methoxy=3.61% and acetic acid=7.15%.

By varying the alkoxy groups and the fatty acid groups, a variety of polystannanediol derivatives can be obtained whereby the nature of the end groups will be determined by the higher or lower voltaility with steam of the alkoxy or fatty acid groups in the starting material.

The new compounds have various uses and are particularly suitable as stabilizers to protect halogen-containing resins against deterioration and discoloration due to the influence of heat and light. Such stabilized resins are disclosed and claimed in our copending patent application, Serial No. 151,524, filed March 23, 1950, now Patent No. 2,631,990, of which this application is a continuation-in-part.

Various modifications of the invention, other than specifically described herein, will be evident and are included within the scope of the appended claims.

What we claim is:

1. As a new composition of matter, the ether ester of a monomeric hydrocarbon-substituted stannanediol of the formula

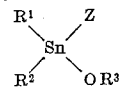

wherein $R^1$ and $R^2$ are monovalent hydrocarbon radicals, $OR^3$ is an alkoxy group, and Z is a carboxylic acid radical selected from the group consisting of monocarboxylic acid radicals and polycarboxylic acid radicals having not more than three carboxyl groups, of which all but one are blocked by esterification.

2. As a new composition of matter, a monoalkoxy alkyl maleate of a dialkyl stannanediol of the formula

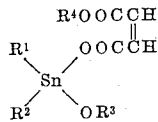

wherein $R^1$ and $R^2$ represent alkyl radicals and $R^3$ and $R^4$ are monovalent aliphatic hydrocarbon radicals.

3. Dibutyl tin monomethoxy methyl maleate of the formula

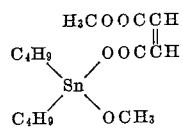

4. Dibutyl tin methoxy oleyl maleate of the formula

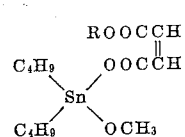

wherein R is the 9-octadecenyl radical.

5. Linear hydrocarbon-substituted polystannanediol ether esters of the formula $$Z-(R^1R^2SnO)_{n-1}-R^1R^2Sn(OR^3)$$

wherein $R^1$ and $R^2$ are monovalent hydrocarbon radicals, $OR^3$ is an olkoxy group, Z is a carboxylic acid radical selected from the group consisting of monocarboxylic acid radicals and polycarboxylic acid radicals having not more than three carboxyl groups, of which all but one of the groups are blocked by esterification, and n is a numeral higher than 1, designating the polymerization degree.

6. A method of preparing hydrocarbon-substituted stannanediol ether esters which comprises reacting in an alcohol an organo-tin dihalide of the formula $R^1R^2SnX_2$ wherein $R^1$ and $R^2$ are monovalent hydrocarbon radicals, and X is a halogen selected from the group consisting of chlorine and bromine, with an alkali metal alcoholate of said alcohol and the salt of a carboxylic acid selected from the group consisting of monocarboxylic acids and polycarboxylic acids having not more than three carboxyl groups, of which all but one of the groups are blocked by esterification, the cation of said salt being selected from the group consisting of alkali and ammonium.

7. A method of preparing linear hydrocarbon-substituted polystannanediol ether esters comprising heating a monomeric hydrocarbon-substituted stannanediol ether ester in the presence of moisture, said stannanediol ether ester having the formula

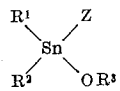

wherein $R^1$ and $R^2$ are monovalent hydrocarbon radicals, $OR^3$ is an alkoxy group, and Z is a carboxylic acid radical selected from the group consisting of monocarboxylic acid radicals and polycarboxylic acid radicals having not more than three carboxyl groups, of which all but one are blocked by esterification.

References Cited in the file of this patent

UNITED STATES PATENTS

| Number | Name | Date |
| --- | --- | --- |
| 2,307,092 | Yngve | Jan. 5, 1943 |
| 2,489,518 | Burt | Nov. 29, 1949 |
| 2,631,990 | Mack et al. | Mar. 17, 1953 |

OTHER REFERENCES

Chem. Ab., vol. 10, page 1263 (1914).